US010416458B2

(12) United States Patent
Schultz et al.

(10) Patent No.: US 10,416,458 B2
(45) Date of Patent: Sep. 17, 2019

(54) HEAD MOUNTED IMAGING APPARATUS WITH OPTICAL COUPLING

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

(*) Notice: Subject to any disclaimer, the term of this patent is extended or adjusted under 35 U.S.C. 154(b) by 0 days.

(21) Appl. No.: 16/312,671

(22) PCT Filed: Jul. 1, 2017

(86) PCT No.: PCT/US2017/040542
§ 371 (c)(1),
(2) Date: Dec. 21, 2018

(87) PCT Pub. No.: WO2018/009467
PCT Pub. Date: Jan. 11, 2018

(65) Prior Publication Data
US 2019/0212563 A1 Jul. 11, 2019

Related U.S. Application Data

(60) Provisional application No. 62/358,432, filed on Jul. 5, 2016.

(51) Int. Cl.
*G02B 27/01* (2006.01)
*G02B 27/00* (2006.01)

(52) U.S. Cl.
CPC ..... *G02B 27/0172* (2013.01); *G02B 27/0081* (2013.01); *G02B 2027/0178* (2013.01)

(58) Field of Classification Search
None
See application file for complete search history.

(56) References Cited

U.S. PATENT DOCUMENTS 5,191,485 A * 3/1993 Kahle ................ G02B 5/04
355/45
7,457,040 B2 11/2008 Amitai
(Continued)

FOREIGN PATENT DOCUMENTS

JP    6-130353 A  *  5/1994

OTHER PUBLICATIONS

International Search Report for International Application No. PCT/US2017/040542 dated Sep. 14, 2017.
(Continued)

*Primary Examiner* — Michael Stahl
(74) *Attorney, Agent, or Firm* — Thomas B. Ryan; Jacob D. Merrill, Esq.; Harter Secrest & Emery LLP

(57) ABSTRACT

A head-mounted virtual image display apparatus has a projector that directs image-bearing light beams along a projection axis. A planar waveguide is configured to receive the image-bearing light beams through an input aperture and to form expanded image-bearing light beams that are output from an output aperture of the waveguide. An optical coupler is configured to receive the image-bearing light beams along the projection axis, to reorient the projection axis with respect to the waveguide, to rotate the image-bearing light beams about the projection axis, and to direct the rotated image-bearing beams along the reoriented projection axis through the input aperture of the waveguide.

22 Claims, 15 Drawing Sheets

(56) References Cited

U.S. PATENT DOCUMENTS

| | | |
|---|---|---|
| 8,827,463 B2 | 9/2014 | Morikuni |
| 9,348,143 B2 | 5/2016 | Gao |
| 2005/0002001 A1* | 1/2005 | Yoon .................... G03B 21/132 353/119 |
| 2006/0238718 A1* | 10/2006 | Erickson ................ G02B 17/02 353/33 |
| 2013/0222896 A1 | 8/2013 | Komatsu |
| 2015/0212325 A1 | 7/2015 | Choi |
| 2016/0195723 A1* | 7/2016 | Murray .............. G02B 27/0172 359/631 |
| 2018/0356637 A1* | 12/2018 | Hu ......................... G06F 3/013 |

OTHER PUBLICATIONS

International Written Opinion for International Application No. PCT/US2017/040542 dated Sep. 14, 2017.

* cited by examiner

HEAD MOUNTED IMAGING APPARATUS WITH OPTICAL COUPLING

TECHNICAL FIELD

This invention generally relates to electronic displays and more particularly relates to a wearable electronic display that forms a virtual image.

BACKGROUND OF THE INVENTION

Head-Mounted Displays (HMDs), which include near-eye displays in a form resembling conventional eyeglasses or sunglasses, are being developed for a range of diverse uses, including military, commercial, industrial, fire-fighting, and entertainment applications. For many of these applications, there is particular value in forming a virtual image that can be visually superimposed over the real-world object-scene image that lies in the field of view of the HMD user.

In general, HMD optics must meet a number of basic requirements for viewer acceptance, including the following:
  (i) sufficient eye relief or eye clearance. The eye relief range is defined based on viewer comfort and the optical configuration of the human eye itself. In practice, the distance between the last optical surface of the HMD optics and the viewer's eye is preferably above about 20 mm.
  (ii) appropriate pupil size. Pupil size requirements are based on physiological differences in viewer face structure as well as on gaze redirection during viewing. An entrance pupil size of at least about 10 mm diameter has been found to be desirable.
  (iii) field of view. A wide field of view is preferable. For many visual tasks, such as targeting and object recognition, a field of view (FOV) approaching about 50 degrees is considered to be desirable.
  (iv) brightness. The virtual image that is generated should have sufficient brightness for good visibility and viewer comfort.

Aspects (i)-(iii) relate to the eyebox, which defines a volume within which the eye of the observer can comfortably view the virtual image. The size of the eyebox depends in part on the length of the path of the light from the image source to where the image is viewed and image source size, and in part on the divergence of the image source and/or the collimation of the light after its emission by the image source. The desirable size of the eyebox depends largely on the quality of viewing experience that is desired from the display and the range of eye positions at which the virtual image is intended to be viewed.

In addition to optical requirements, HMD designs should also address practical factors such as variable facial geometry, acceptable form factor with expectations of reduced size for wearing comfort, weight, and cost, and ease of use.

A goal for most HMD systems is to make the imaging/relay system as compact as possible; however, when using conventional optics, there are basic limits. The output of the optic system should have a pupil that is large enough to fill the pupil of the viewer's eye and also allow for some movement of the eye. In a binocular system there is also the issue of varying intraocular distances among different users and the need for the output pupil of the optical system to allow for this.

A number of near-eye HMD devices use planar waveguides. These devices often employ a series of optical diffraction gratings and total internal reflection (TIR) to laterally translate the exit pupil of a projection system so that the projection system can be located to the side of the viewing path, such as alongside the viewer's head. Optical waveguides also expand the exit pupil in one or two dimensions so that the size of the imaged-light projection system can be reduced. This allows the exit pupil of the projection system to be quite small while enlarging the eyebox and allowing the projection system to be moved out of the viewer's line of site. At the same time, the waveguide can be transparent, so the virtual image can be superimposed over the ambient environment.

With the bulk of the projection optics laterally translated out of the user's view and highly compact, there is still a desire to configure the projection components to a form factor that is more consistent with glasses and thus more acceptable to a broad user population. A number of approaches have been proposed for using a prism or mirror to fold the optical path. However, the net effect has often been awkward placement of projection components, such as having these components further removed from the waveguide, increasing the dimensional requirements of the head-mounted device.

Another difficulty with proposed approaches relates to imaging aspect ratios and device form factors that are conventionally used for projection devices and that have been adapted for use with micro-projector and so-called "pico-projector" devices. The imaging height-to-width aspect ratio for projection can be 9 to 16 (9:16), for example. Projection devices are correspondingly designed with a shorter vertical (height) dimension and a larger horizontal (width) dimension. This makes it awkward to employ a conventional projector design with a waveguide HMD; a more suitable aspect ratio would be achieved by rotating the projector 90 degrees and allowing the projector to fit snugly against the viewer's head, rather than to extend horizontally outward. The usable image area, however, would be reduced by such an arrangement.

There is thus a need for an HMD that incorporates a more compact projector and allows projector rotation and seating of the projector near the side of the viewer's head.

SUMMARY OF THE INVENTION

One object of the present disclosure is to advance the art of virtual image presentation using head-mounted devices. Advantageously, embodiments of the present disclosure provide light coupling solutions that are compatible with the general form factor of eyeglasses and allow the use of projector optics that are rotated and fitted against the side of the viewer's head.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided head-mounted virtual image display apparatus comprising:
  a) a projector that directs image-bearing light beams along a projection axis;
  b) a planar waveguide that is oriented at an obtuse angle with respect to the projection axis, wherein the waveguide is configured to receive the image-bearing light beams through an input aperture, to expand the image-bearing light beams, and to output the expanded image baring beams through an output aperture of the planar waveguide, wherein the output aperture is spaced apart from the input aperture along the planar waveguide; and c) an optical coupler that is configured to receive the image-bearing light beams along the projection axis, to reorient the projection axis with respect to the planar waveguide, to rotate the image-bearing light beams about the projection axis, and to direct the rotated image-bearing beams along the reoriented projection axis through the input aperture of the planar waveguide.

The optical coupler can comprise a first prism facing the projector and having a first reflective surface reorients the projection axis; and a second prism that is optically coupled to the first prism and has a second reflective surface that further reorients the projection axis. In addition, the optical coupler can further comprise a third prism that is optically coupled to the second prism and has a third reflective surface that yet further reorients the projection axis to an acute angle with respect to the waveguide. An optical stop of the projector can be disposed within the optical coupler.

The planar waveguide is preferably configured to receive the image-bearing light beams through an input aperture along a central input beam axis, and the optical coupler is preferably configured to reorient the projection axis into alignment with the central input beam axis. In addition, the planar waveguide is preferably configured to output the expanded image-bearing beams through the output aperture along a central output beam axis, and the central input beam axis preferably intersects the central output beam axis on a side of the planar waveguide facing the projector.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings, wherein:

FIG. 1 is a top view schematic of an HMD including a virtual image display apparatus mounted on a viewer's head.

FIGS. 2A, 2B, and 2C are top view schematics of a planar waveguide incorporating in-coupling and out-coupling diffractive optics for directing an image-bearing light beam into and out of the waveguide in various angular relationships.

Figure 1:
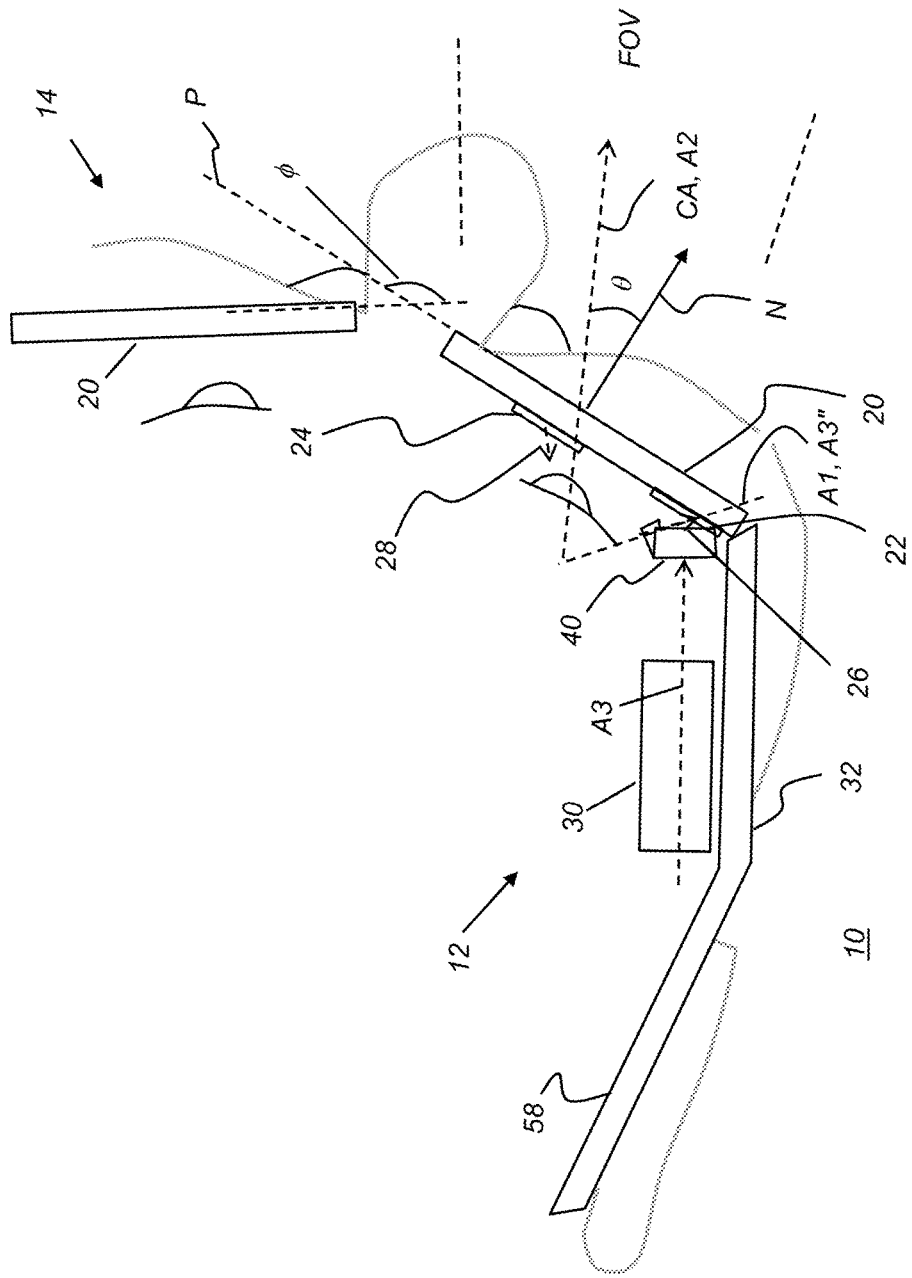

FIGS. 10A, 10B, 10C, 10D, and 10E show orthogonal cross-sections of projector light beams at different positions along the optical path within and through the optical coupler.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure.

In the context of the present disclosure, the terms "viewer", "operator", "observer", and "user" are considered to be equivalent and refer to the person who wears the HMD viewing device.

As used herein, the term "energizable" relates to the capability of a device or set of components upon receiving power and, optionally, upon receiving an enabling signal to perform an indicated function.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered oblique with respect to each other if they diverge from or converge toward each other at an angle that is at least about 5 degrees or more away from parallel, or at least about 5 degrees or more away from orthogonal. An "obtuse angle" is larger than 90° but less than 180°.

The terms "coupled" or "coupler" in the context of optics refers to a connection by which light travels from one optical medium or device to another optical medium or device through an intermediate structure that facilitates the connection.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality display. For example, the apparent size of a virtual image is not limited by the size or location of a display surface. In comparison with systems that project a real image, a more realistic viewing experience can be provided by forming a virtual image that appears to be some distance away. Providing a virtual image also obviates any need to compensate for screen artifacts, as may be necessary when projecting a real image.

A HMD (head-mounted display) 10 is shown in FIG. 1 within a frame 58 that is mounted on a viewer's face to provide a near-eye display. In the description that follows, the optical path components, spacing, and constraints are described with reference to the right eye of a viewer 14 as represented in FIG. 1. The same characteristics and constraints can optionally apply for the left eye, with parallel components and corresponding changes in component positioning.

In a binocular virtual image display apparatus 12, a planar waveguide 20 can be provided for each eye of the viewer 14. In such a binocular system as shown in FIG. 1, two planar waveguides 20, considered from a top view, are disposed at an obtuse "chevron" angle ϕ with respect to each other. A monocular system, according to an embodiment of the present disclosure, provides a single projector 30 and corresponding waveguide 20, along with supporting optics as described in more detail below. Viewer 14 has a corresponding ambient field of view (FOV) or view path through the transparent waveguide 20. The FOV is substantially centered about a center axis CA that can be normal or oblique to the planar waveguide 20. In the exemplary system of FIG. 1, the center axis CA is oblique, at an angle θ from a normal N to the planar waveguide 20.

Figure 2A:
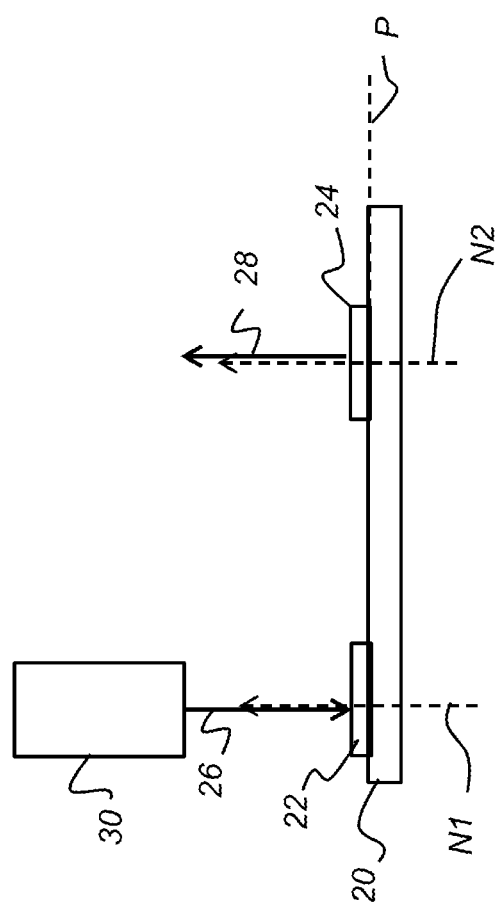
Figure 2B:
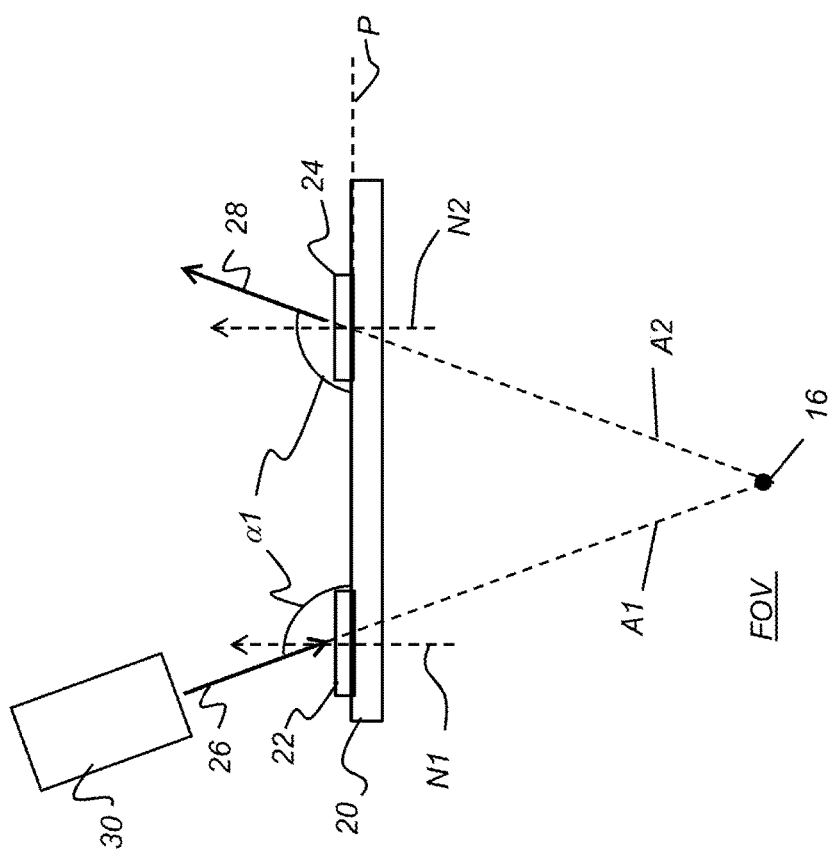
Figure 2C:
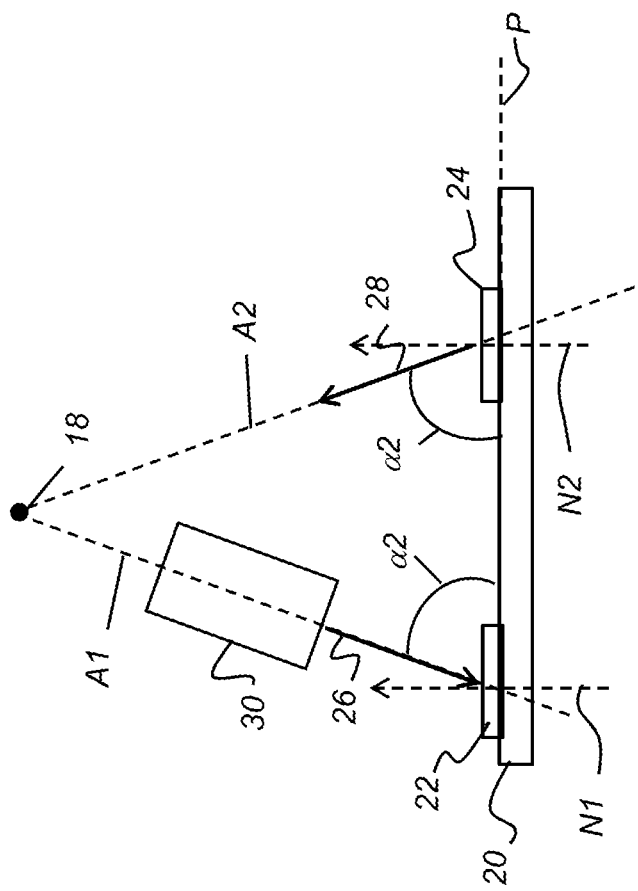

Waveguide 20 is formed of glass or other transparent optical material and incorporates two or more embedded optical gratings that cooperate with TIR within the waveguide structure to resize and redirect incident image-bearing beams into and out of the waveguide 20. For example, waveguide 20 has characteristic behavior relative to incident input beam 26 and exiting output beam 28 as shown in FIGS. 2A, 2B, and 2C. Image-bearing beams directed through an input aperture 22 propagate along waveguide 20, such as by total internal reflection (TIR), and exit the waveguide 20 through an output aperture 24. The periodic structure and orientation of its embedded gratings widen the image-bearing beams in two orthogonal directions in a plane P of the planar waveguide, effectively expanding the pupil size formed by an area of overlap among the image-bearing beams. For example, when the input beam 26 considered as the centermost of the image-bearing beams is directed at a normal N1 to the plane P, the corresponding centermost output beam 28 exits at a normal N2 to the plane P, as shown in FIG. 2A. While this arrangement is possible using the HMD of FIG. 1, practical factors including viewer anatomy, component packaging and spacing, usability, and image quality generally compel orienting the central input beam 26 at an oblique angle incidence to the waveguide 20.

In a symmetry preserving arrangement, when central input beam 26 is oriented at an oblique angle of incidence to plane P, the corresponding central output beam 28 exits at a corresponding oblique angle, as shown in the examples of FIGS. 2B and 2C. In the FIG. 2B configuration, the axis A1 of the central input beam 26 is oriented at an obtuse angle α1 with respect to plane P of the waveguide 20. An axis A2 of the central output beam 28 is oriented at the same obtuse angle α1 with respect to plane P. Axis A1 of the central input beam 26 intersects axis A2 of the central output beam 28 at a point 16 on the outer side of waveguide 20, within the field of view FOV of the viewer.

In the FIG. 2C configuration, the axis A1 of the central input beam 26 (also referenced as the central input beam axis A1) is oriented at an acute angle α2 with respect to plane P of the waveguide 20. The axis A2 of the central output beam 28 (also referenced as the central output beam axis A2) is oriented at the same acute angle α2 with respect to plane P. Here, axis A1 of the central input beam 26 intersects the axis A2 of the central output beam 28 at a point 18 on the viewer's side of waveguide 20.

Equating the central output beam axis A2 to the center axis CA of the FOV of FIG. 1 in a symmetry preserving arrangement, the central input beam axis A1 intersects the central output beam axis A2 on the viewer's side of the waveguide 20 as shown in FIG. 2C. That is, the central input beam 26 along the axis A1 (shown in dashed outline) is oriented with respect to the plane P of the waveguide 20 through an acute angle α2 similar to the symmetric orientation of the central output beam along the axis A2. With this relationship, the two axes A1 and A2 intersect on the viewer's side of waveguide 20 as shown in FIG. 2C.

As also shown in FIG. 1, a projector 30 is positioned along a portion of the frame 58 of HMD 10, which is termed a temple member 32. For fitting the viewer's head, the temple member 32 is oriented at an obtuse angle with respect to the plane P of the waveguide 20. The projector 30 can be a pico-projector, for example, using solid-state light sources and some type of beam modulation, such as from a micromirror array or Digital Light Processing (DLP) device from Texas Instruments, for example. Focusing optics of the projector encode a real image generated by the projector as a set of angularly related image-bearing beams centered about a projection axis A3. Since the projector 30 is mounted along the temple 32 as shown, the projection axis A3 is also oriented at an obtuse angle with respect to the plane P of waveguide 20. Thus, relative to waveguide 20, the angular orientation of the projection axis A3 to the plane P of the waveguide 20 is oppositely skewed with respect to the orientation of the central input beam axis A1 that is needed for properly directing light into the waveguide 20 to reach the viewer's pupil along the central output beam axis A2 corresponding to the center axis CA of the intended FOV. Thus, the projection axis A3 of the projector 30 needs to be redirected into alignment with the axis A1 of the central input beam 26. For purposes of mounting the projector 30 in a compact configuration along the temple 32 as shown, embodiments of the present disclosure employ an optical coupler 40 that redirects light from projection axis A3 into alignment with the center input beam axis A1.

The projector 30 is preferably also of a type having an aspect ratio, such as the preferred 9:16 aspect ratio, where the width of the generated image exceeds the height of the generated image. The imbalanced aspect ratio affects corresponding dimensions of the projector 40 and its optics. The HMD can be made more compact by rotating the projector 30 about the projection axis A3 by 90 degrees so that the range of angles of the image-bearing beams encoding the width dimension of the image is oriented normal to the view of FIG. 1. Thus, in addition to aligning the projection axis A3 with the axis A1 of the central input beam 26, the optical coupler 40 can also be arranged to rotate the encoded image by 90 degrees in an opposite direction to restore the orientation of the encoded image as intended for viewing as a virtual image.

Figure 3B:
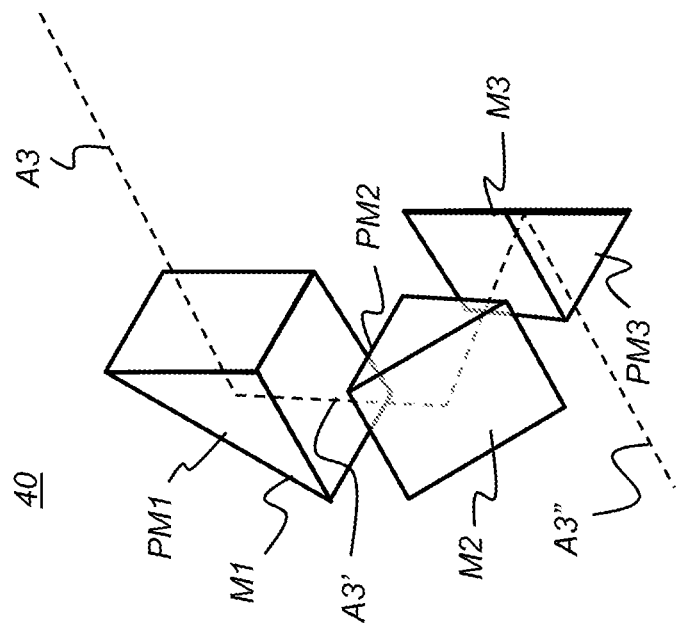
FIG. 3B is an exploded view of the optical coupler of FIG. 3A.
Figure 3A:
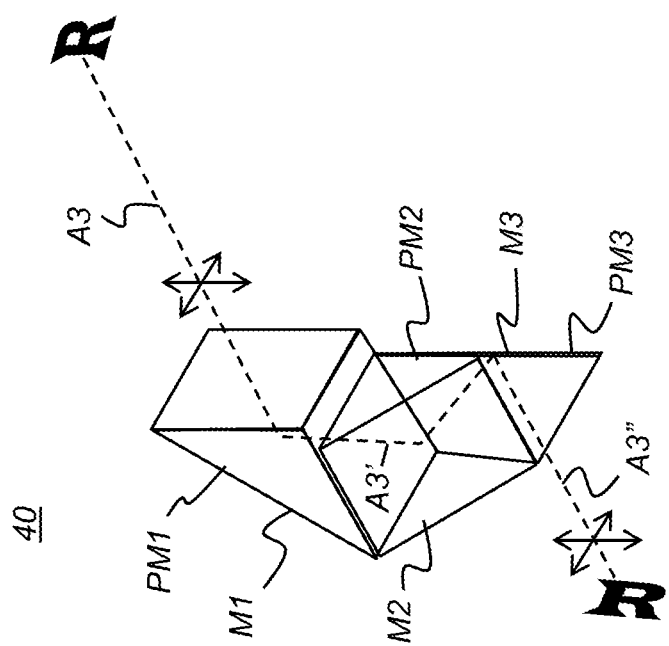
FIG. 3A is a perspective view of an optical coupler formed from three right-angle prisms.

The perspective view of FIG. 3A and exploded view of FIG. 3B show the optical coupler 40 according to an embodiment of the present disclosure for reorienting the encoded image, which is represented schematically by the letter "R". Optical coupler 40 can be assembled from three right angle prisms PM1, PM2, and PM3 that cooperate to rotate the image "R". Incident face of input prism PM1 receives image-bearing light from projector 30 along projection axis A3. The image-bearing light reflects from a reflecting surface M1 of prism PM1 toward intermediate prism PM2, thereby folding the projection axis A3 as the internally folded projection axis labeled axis A3'. A reflecting surface M2 of prism PM2 further reflects the image-bearing light toward the prism PM3, thereby further folding the internally folded projection axis A3'. A reflective surface M3 of prism PM3 yet further reflects the image-bearing light out of the optical coupler 40, thereby yet further folding the internally folded projection axis A3', which exits the optical coupler 40 as an offset projection axis labeled A3". The image-bearing light along the offset projection axis A3" is rotated 90 degrees with respect to its initial orientation about the projection axis A3, which is shown as the rotation of the image "R" through 90 degrees. The angularly encoded image-bearing beams can each be in the form of a collimated beam (i.e., a bundle of parallel rays) having a unique angular orientation in two orthogonal planes. Within positions of overlap, such as at the exit of the optical coupler 40, a lens placed at this position can form a real image, such as the image "R", on a surface one focal length away. In the version shown, the offset projection axis A3" remains parallel to the projection axis A3, featuring the rotational function of the optical coupler 40.

Reflective surfaces M1, M2, and M3 of the prisms PM1, PM2, and PM3 can be mirrored surfaces, such as dielectric or metalized surfaces. Alternately, where the index of refraction of the prism material is sufficiently high, total internal reflection (TIR) can be used, obviating the need for a reflective coating for folding the optical axis A'. Prisms PM1, PM2, and PM3 can be cemented to each other along their adjoining faces, such as with an index matching adhesive. An anti-reflection coating can be provided along the input and output surfaces of the optical coupler 40.

While the arrangement shown in FIGS. 3A and 3B provides the desired rotation of the image "R", alignment of the projection axis A3 with the axis A1 of the central input beam 26 may also be needed to accommodate eyewear frames, such as the frame 58 having projector-mounted temples 32 oriented at obtuse angles to the plane P of the waveguides 20.

Figure 4B:
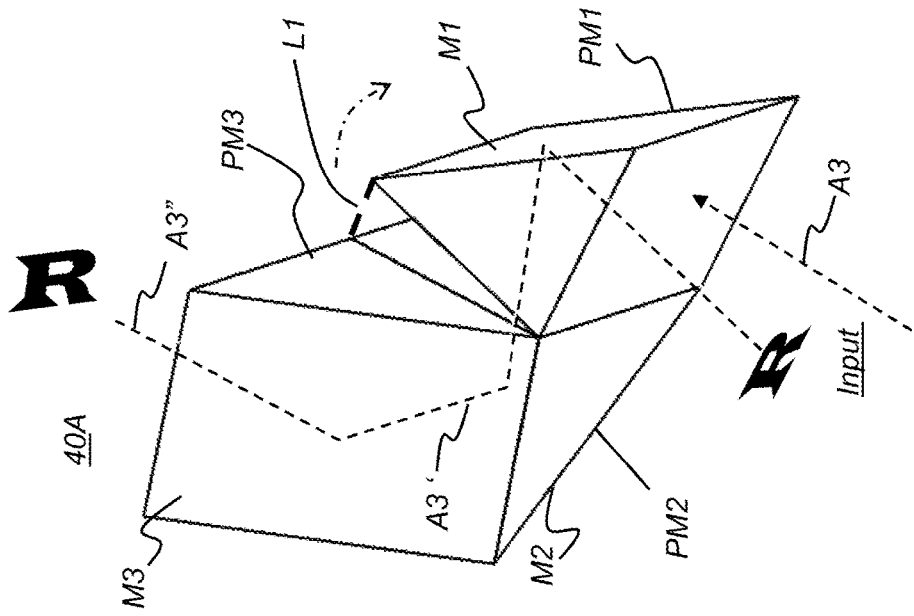
FIG. 4B is a similar perspective view of an optical coupler for orthogonally rotating an image traversed by an optical axis having non-orthogonal line segments extending through an optical coupler.
Figure 4A:
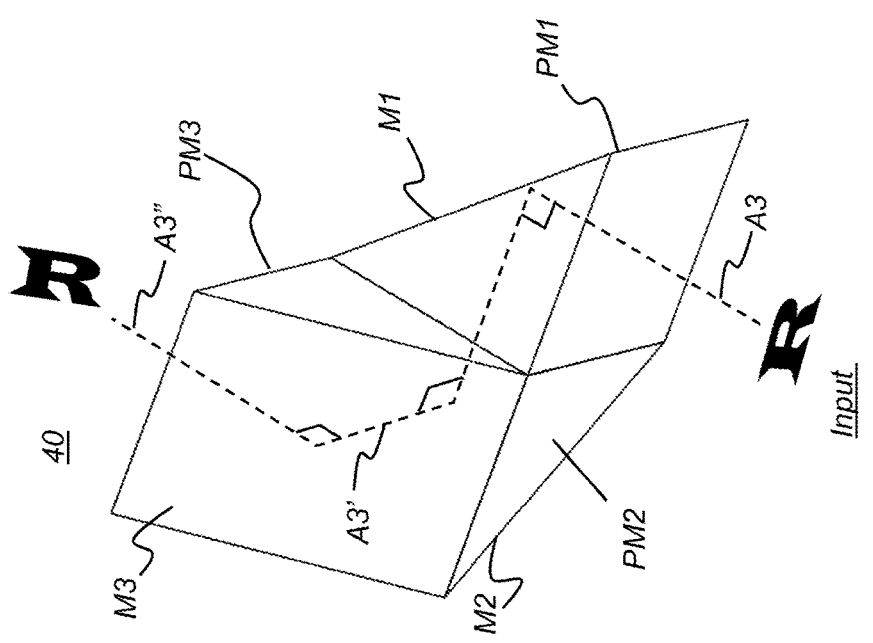
FIG. 4A is a perspective view of an optical coupler for orthogonally rotating an image traversed by an optical axis having orthogonal line segments extending through an optical coupler.

FIG. 4A reproduces the optical coupler 40 of FIGS. 3A and 3B in a new orientation for comparison to a modified version of the optical coupler referenced as optical coupler 40A in FIG. 4B. The image-bearing beams centered about the projection axis A3 in FIG. 4A propagate within the optical coupler 40 along the internally folded projection axis A3' through a series of three orthogonal folds before being output from the optical coupler 40 along the offset projection axis A3" in an orientation that preserves the original angular orientation of the projection axis A3.

The optical coupler 40A of FIG. 4B tilts the prism PM1 with respect to the prism PM2 creating an angular separation. As shown, the prism PM1 is angularly rotated with respect to the prism PM2 about a line of intersection between two of the exposed faces of the prisms PM1 and PM2 creating a wedge-shaped separation shown by the dashed line L1. Other slight changes to prism shape for prisms PM2 and PM3 can also be used to change the resulting angular folds from the orthogonal folds shown in FIG. 4A. The non-orthogonal folds progressively reorient the internally folded projection axis A3' so that the offset projection axis A3" output from the optical coupler 40A is offset both spatially and angularly with respect to the projection axis A3.

Figure 5:
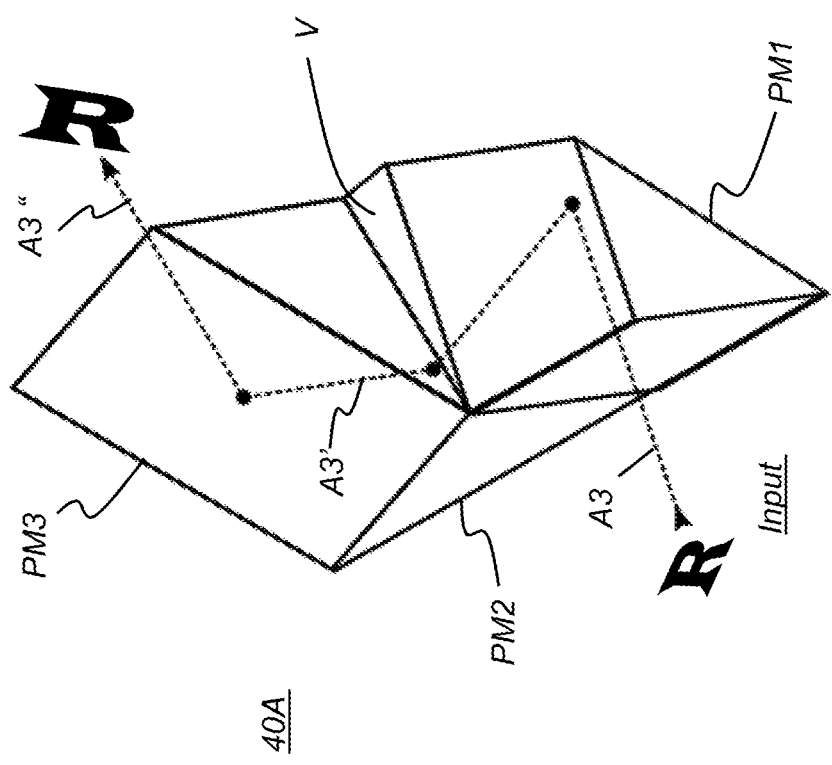
FIG. 5 is a perspective view of the optical coupler of FIG. 4B for orthogonally rotating an image traversed by an optical axis having non-orthogonal line segments extending through an optical coupler.

FIG. 5 shows a perspective view of the optical coupler 40A as an integral structure capable of performing both the desired rotation of the image "R" and the desired angular offset between the projection axis A3 that enters the optical coupler 40A and the offset projection axis A3" that exits the optical coupler 40A. In the integral structure, the angular separation between the prisms PM1 and PM2 is filled by an optical wedge V, which can be formed as a separate optic or as a part of either of the adjoining prisms PM1 or PM2.

Figure 6:
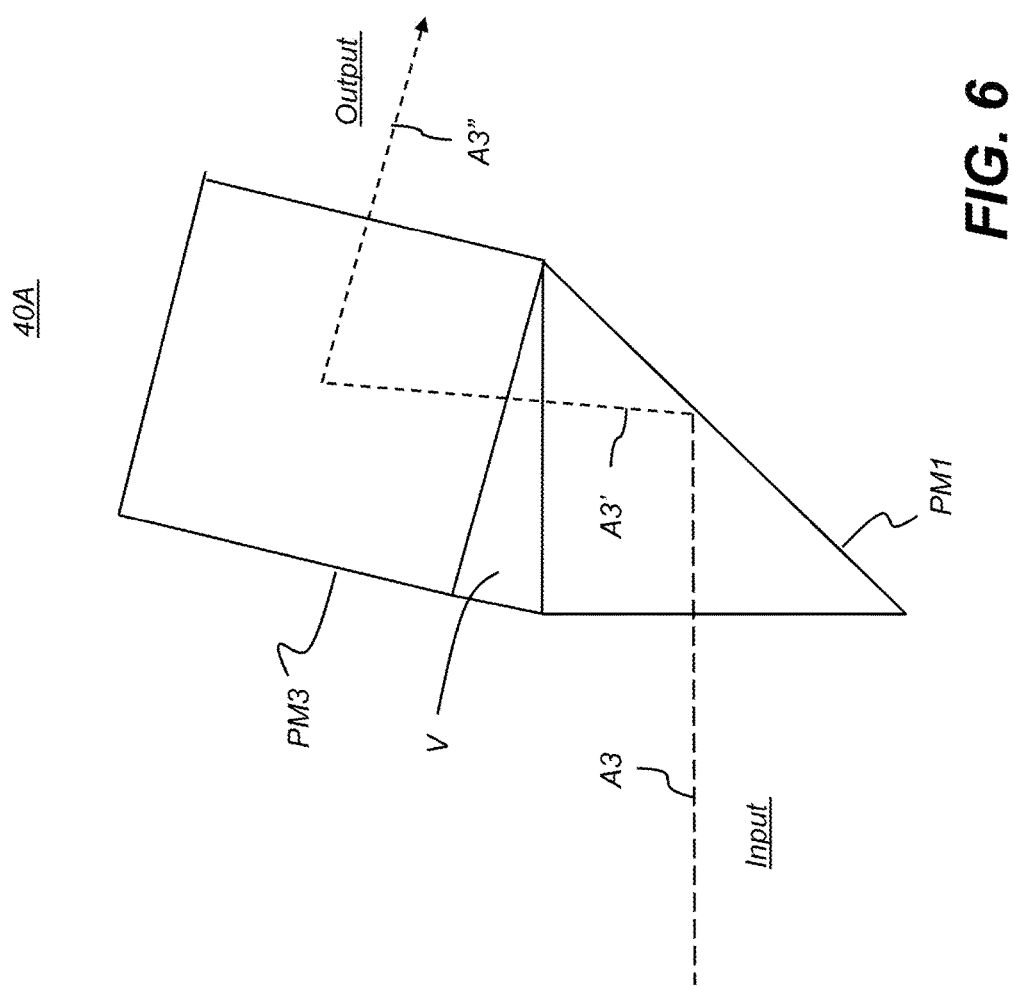
FIG. 6 is a top view of the optical coupler of FIG. 5 showing an alternative path of an optical axis through optical coupler.

FIG. 6 a top view of the optical coupler 40A in a plane similar to the view of FIG. 1, showing the spatial and angular offset of the offset projection axis A3" with respect to the projection axis A3. Thus, the optical coupler 40A can be arranged to both rotate the encoded image output from the projector 30 along the axis A3 through 90 degrees and angularly align the offset projection axis A3" with the axis A1 of the central input beam 26 so that the image-bearing beams are properly directed into the waveguide 20 to reach the viewer's pupil along the central output beam axis A2 corresponding to the center axis CA of the intended FOV.

Figure 7A:
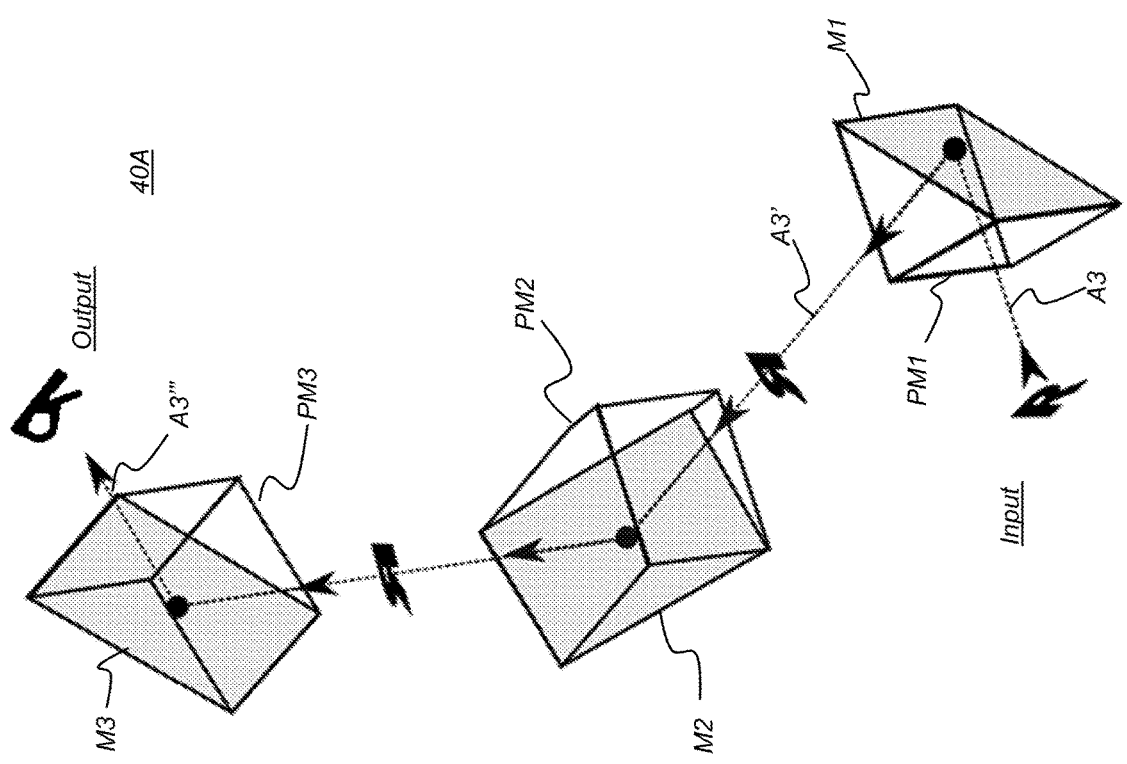
FIG. 7A is an exploded view of the optical coupler showing progressive rotations of an image though the individual prisms of the optical coupler.
Figure 7B:
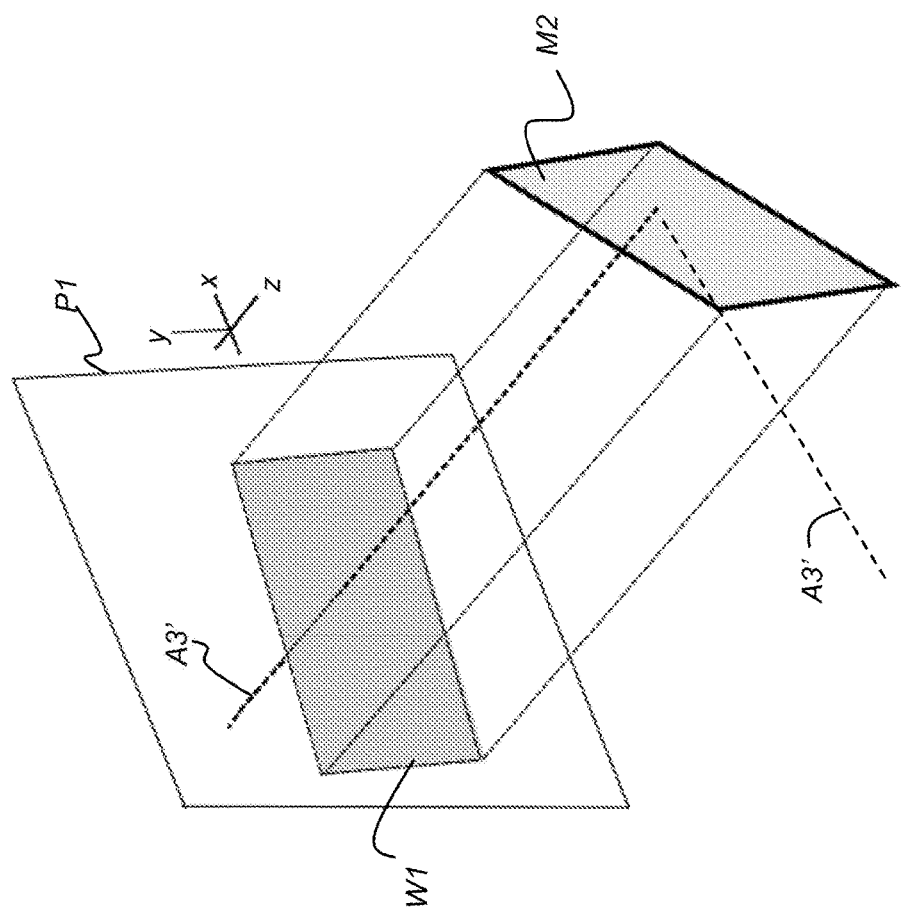
FIG. 7B is a schematic diagram showing the normal projection of an oblique surface onto a plane.

An exploded view of the optical coupler 40A in FIG. 7A shows the relative orientation of reflective surfaces M1, M2, and M3 that reorient the internally folded projection axis A3' and rotate image orientation. A schematic diagram in FIG. 7B shows the geometrical meaning of the "projection of a surface" onto a plane. Here, reflective surface M2, which is oblique to the internally folded projection axis A3' is projected along the projection axis A3' onto a plane P1 that is normal to the projection axis A3'. This projection defines an area W1 whose shape and size are directly related to the shape, size, and angular orientation of the projected surface M2.

Projector Optics Design

Projectors, using a variety of display technologies, can be found in a form factor that is fairly compact, have a pupil size comparable to the entrance aperture of an optical waveguide, and have the brightness required to provide a reasonably bright image. However, within the projection optics of these projectors there is often a stop (this can be a physical aperture or a lens aperture acting as a stop) within the lens system. This means that the ray bundles for each field point in the virtual image begin to diverge within the projection optics before or at the last outermost lens surface of the projector. The ray bundles originating from the corners of the image generator are often clipped (vignetted) as they diverge from the projection optics. The further removed from the waveguide, the more divergence there is in the ray bundles. With this problem in mind, an embodiment of the present disclosure provides further advantages for HMD imaging with improvements to projector optics design.

Figure 8:
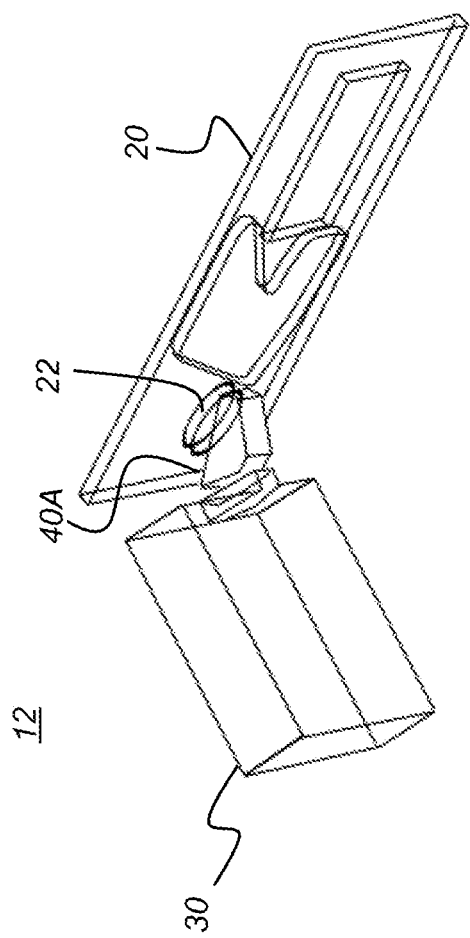
FIG. 8 is a perspective view of a virtual image display apparatus including a projector coupled to a waveguide for generating a virtual image.

In embodiments of the present disclosure, the stop can be positioned outside the projector, beyond the last optical surface of the projector that emits the projected image-bearing light beam. The stop may be viewed as an exit pupil rather than a physical stop. Embodiments shown herein position a mirrored surface at or near the remote pupil to form a stop. For virtual image display apparatus 12 in HMD 10, this design feature constrains the beam width of light that is delivered to optical coupler 40A and enables coupler 40A to be more compact. With reference to the perspective view of FIG. 8, a stop can be provided at any suitable location along the path of light from projector optics. Embodiments of the present disclosure position a stop forward of the projection lens, so that optical coupler 40A can re-position the stop substantially at the input aperture 22 of waveguide 20. By "substantially at the input aperture 22" is meant at least forward of the exit surface of prism PM3 or otherwise beyond the exit aperture of optical coupler 40A. The stop can alternately be within optical coupler 40A.

According to an embodiment of the present disclosure, the virtual image display apparatus 12 uses an optical coupler 40A to provide the stop for projected light from projector 30. In one example of the virtual image display apparatus 12, optical coupler 40A provides a stop at an internal reflective surface and has an angular arrangement that improves upon the orthogonal rotation configuration shown in FIGS. 3A and 3B for suitability to the ergonomic arrangement of the head-mounted device (HMD).

Figure 9:
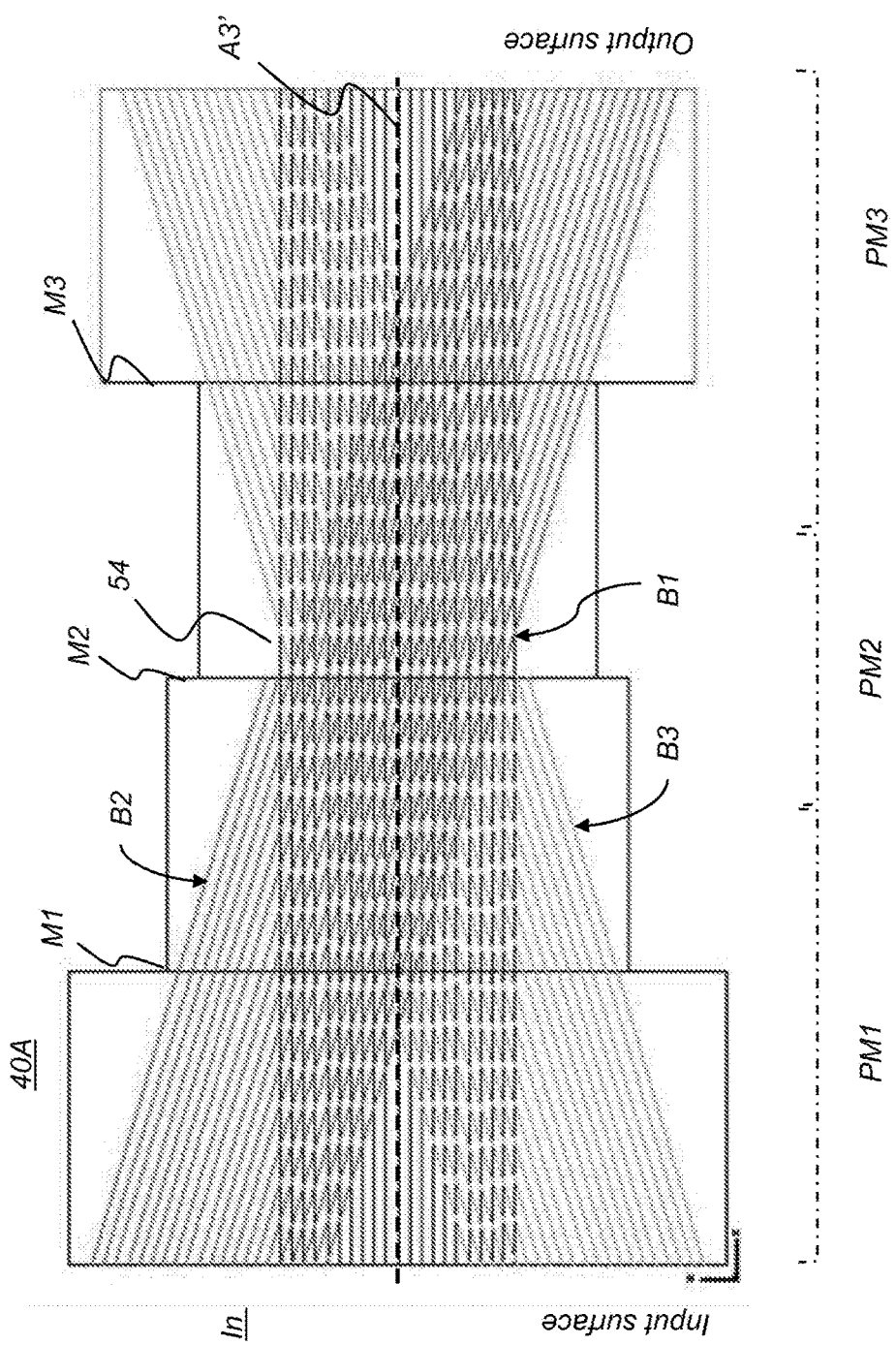
FIG. 9 is a diagram showing light paths angularly distributed about an axis extending through the prisms of an optical coupler.

The optical coupler 40A is therefore arranged having regard for both the spread of the angularly related image-bearing beams and the location of a stop. According to an embodiment, mirror M2 on prism PM2 provides the stop for the projection optics. The schematic diagram of FIG. 9 shows an unfolded optical path of coupler 40A along the internally folded projection axis A3', extending through prisms PM1, PM2, and PM3, using the modified geometry of FIG. 4B. Stop 54 is located within prism PM2 at or near reflective surface M2, which is itself located at or near a confluence of the angularly related image-bearing beams output from the projector 30. At the stop 54 the three depicted image-bearing beams B1, B2, and B3 occupy the smallest collective transverse area. To provide a stop for the projected light, reflective surface M2 of middle prism PM2 is sized so that it has a smaller area than either the input or output surface of coupler 40 or the reflective surface M1 of first prism PM1 that accepts incident light from the projector 30. Middle prism PM2 is also sized so that it has a smaller area than reflective surface M3 of output prism PM3 that directs projected light out of the optical coupler 40A toward to the waveguide 20, as described previously with respect to FIG. 1, for example.

More generally, the optical coupler 40A can have a stop 54 associated with any of the surfaces of prisms PM1, PM2, and PM3, including the input surface at PM1, the output surface at PM3, or any of the intermediate reflective surfaces M1, M2, or M3. For at least one of the reflective surfaces M1, M2, or M3, the area defined by projection of the reflective fold surface onto a plane that is normal to the redirected projection axis A3' is less than the surface area of the input surface and less than the surface area of the output surface. In particular, this relationship holds where the reflective fold surface serves as the stop, as with the surface M2 in the examples FIG. 9 and subsequent figures.

Figure 10B:
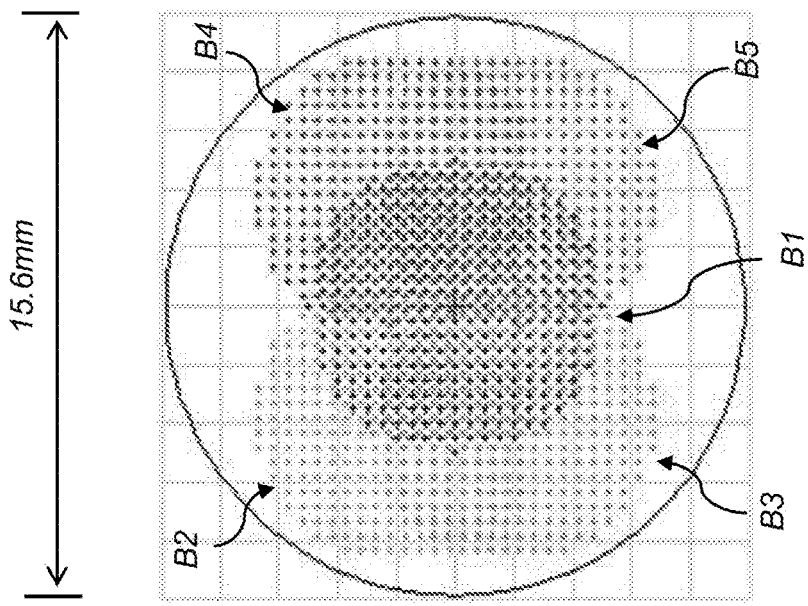
Figure 10A:
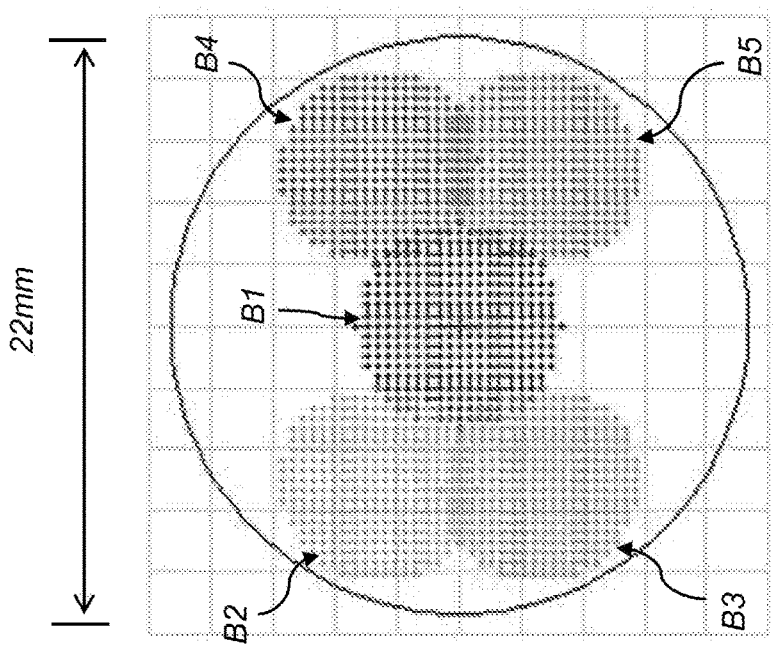
Figure 10D:
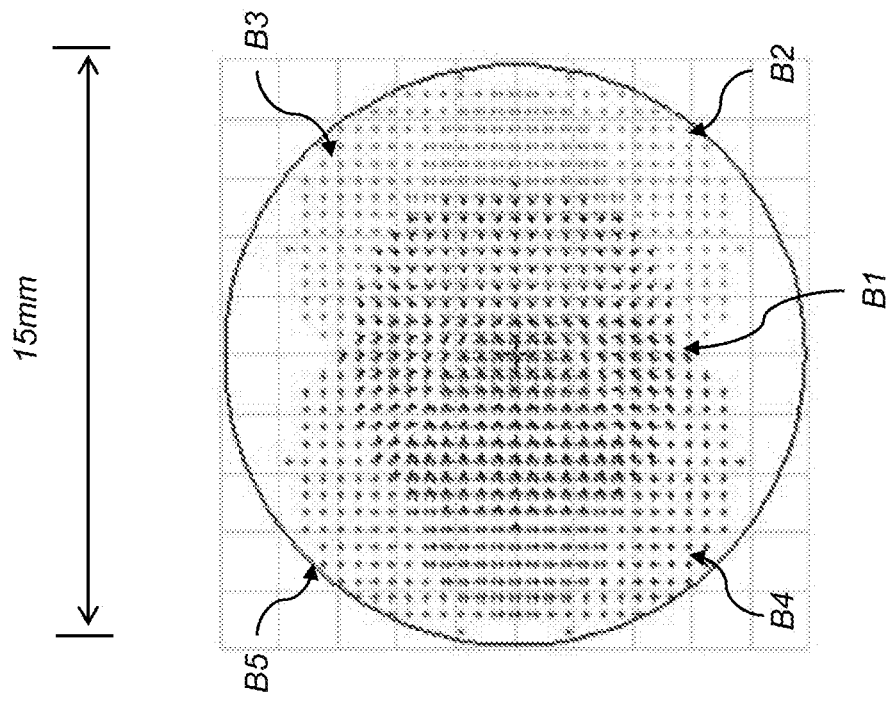
Figure 10C:
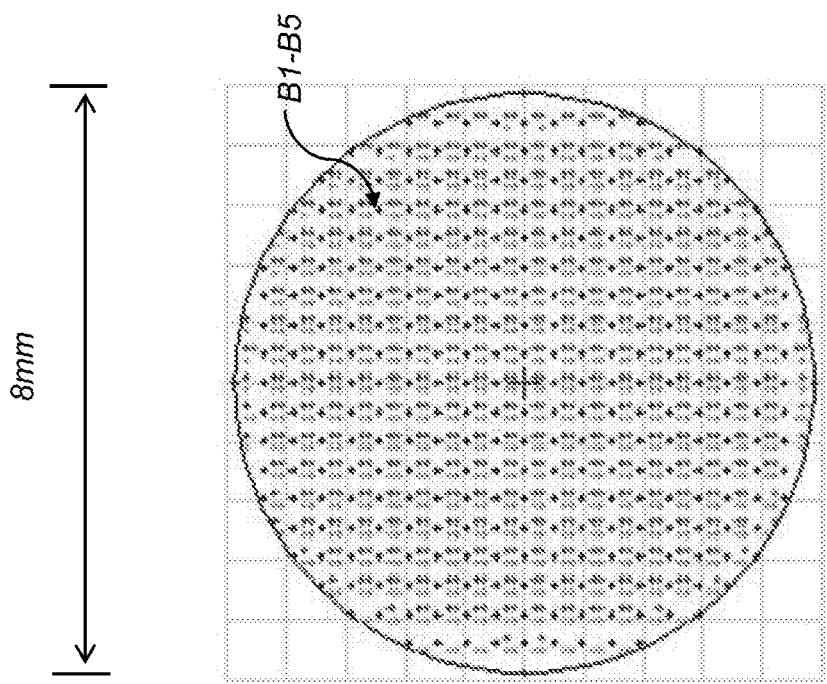

FIGS. 10A, 10B, 10C, 10D, and 10E are orthogonal views taken along planes normal to the projection axis A3' showing cross sections of five image-bearing beams, B1, B2, B3, B4, and B5 at different points along and within optical coupler 40A. Relative scale values show the approximate aperture size for each of these figures. As apparent from previous descriptions, the projected light, within coupler 40A, encounters a number of reflective surfaces having respective surfaces normal that are inclined to the incident light. However, input and output (external) surfaces of optical coupler 40A are preferably oriented at or close to normal with respect to the nominal direction of propagation among the image-bearing beams as represented by the projection axes. FIG. 10A shows a distribution among the image-bearing beams B1-B5 incident upon the input surface to prism PM1. FIG. 10B shows an orthogonal cross section of the image-bearing beams B1-B5 approaching mirror M1. FIG. 10C shows an orthogonal cross section of the image-bearing beams B1-B5 approaching mirror M2. Aperture dimensions are noticeably smaller at this point, since mirror M2 is at or very near the optical stop.

Figure 10E:
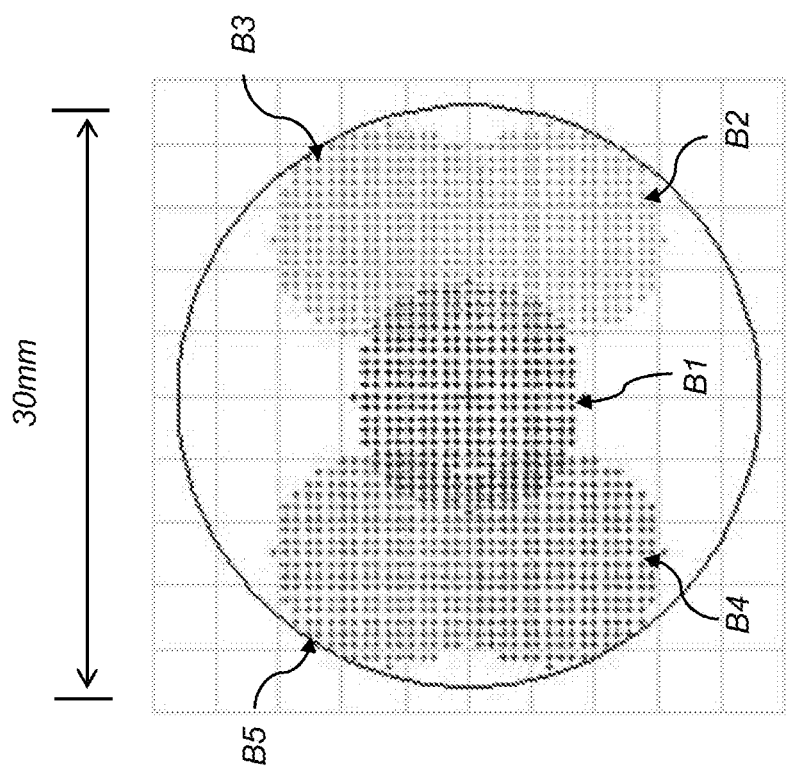

FIG. 10D shows an orthogonal cross section of the image-bearing beams B1-B5 approaching mirror M3. FIG. 10E shows an orthogonal cross section of the light at the output surface. Particularly for the light at mirror M2 that is at the aperture stop location, the area bounded by the projection of the light at the mirrored surfaces, with respect to a plane normal to the redirected optical axis, is less than the area of the light at other surfaces.

In general, higher index glass (n>1.6) is advantageous for reducing the optical path dimensions with coupler 40. As noted previously, the virtual image display apparatus of the present disclosure can be used in a monocular or binocular optical system.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

| REFERENCE ELEMENTS | |
|---|---|
| 10 HMD | B1, B2, B3, B4, B5 Image-bearing beams |
| 12 Virtual image display apparatus | |
| 14 Viewer | |
| 16 Point | CA Center axis |
| 18 Point | FOV Field of view |
| 20 Waveguide | L1 Line |
| 22 Input aperture | M1, M2, M3 Reflective surface |
| 24 Output aperture | N1, N2 Normal |
| 26 Central input beam | P, P1 Plane |
| 28 Central output beam | PM1, PM2, PM3 Prism |
| 30 Projector | V Wedge |
| 32 Temple member | W1 Area |
| 40 Optical coupler | |
| 40A Optical Coupler | α1 Obtuse input/output angle |
| 54 Stop | α2 Acute input/output angle |
| 58 Frame | θ Center field Angle |
| | φ Chevron angle |
| A1 Central input beam axis | |
| A2 Central output beam axis | |
| A3 Projection axis | |
| A3' Internally folded projection axis | |
| A3" Offset projection axis | |

The invention claimed is:

1. A virtual image display apparatus comprising:
   a) a projector that directs image-bearing light beams along a projection axis;
   b) a planar waveguide that is oriented at an obtuse angle with respect to the projection axis, wherein the waveguide is configured to receive the image-bearing light beams through an input aperture, to expand the image-bearing light beams, and to output the expanded image-bearing beams through an output aperture of the planar waveguide, wherein the output aperture is spaced apart from the input aperture along the planar waveguide; and
   c) an optical coupler that is configured to receive the image-bearing light beams along the projection axis, to reorient the projection axis with respect to the planar waveguide, to rotate the image-bearing light beams about the projection axis, and to direct the rotated image-bearing beams along the reoriented projection axis through the input aperture of the planar waveguide.

2. The apparatus of claim 1 wherein the optical coupler is further configured to reorient the projection axis to an acute angle with respect to the planar waveguide.

3. The apparatus of claim 1 wherein the planar waveguide is further configured to receive the image-bearing light beams through the input aperture along a central input beam axis, and the optical coupler is further configured to reorient the projection axis into alignment with the central input beam axis.

4. The apparatus of claim 3 wherein the planar waveguide is further configured to output the expanded image-bearing beams through the output aperture along a central output beam axis, and the central input beam axis intersects the central output beam axis.

5. The apparatus of claim 1 wherein the optical coupler has an input surface and an output surface, and the optical coupler has at least one reflective fold surface that redirects the projection axis at an oblique angle to the reflective fold surface, wherein an area defined by projection of the one reflective fold surface onto a plane that is normal to the redirected projection axis is less than a surface area of the input surface and less than a surface area of the output surface.

6. The apparatus of claim 1 wherein the optical coupler is formed from a plurality of optical prism elements.

7. The apparatus of claim 6 wherein each optical prism element has an index of refraction above 1.6.

8. The apparatus of claim 6 wherein one or more of the optical prism elements is a right angle prism.

9. The apparatus of claim 1 wherein one of two sides of the planar waveguide faces the projector, and the planar waveguide both accepts and outputs the projected light beam through the side that faces the projector.

10. The apparatus of claim 1 wherein the optical coupler redirects the projection axis using total internal reflection.

11. The apparatus of claim 1 wherein the optical coupler redirects the projection axis using one or more mirrored surfaces.

12. The apparatus of claim 1 wherein an optical stop of the projector is disposed substantially at the input aperture of the planar waveguide.

13. The apparatus of claim 1 wherein an optical stop of the projector is disposed within the optical coupler.

14. The apparatus of claim 13 wherein an optical stop of the projector is disposed at a reflective surface within the optical coupler.

15. The apparatus of claim 13 wherein an optical stop of the projector is disposed at an incident surface within the optical coupler.

16. A head-mounted display having a frame that houses a virtual image display apparatus that is energizable to display a virtual image to an eye of a viewer, wherein the virtual image display apparatus comprises:
  a) a projector energizable to emit image-bearing light beams along a projection axis, wherein the projector is coupled to a temple member of the frame;
  b) a planar waveguide that is oriented at an obtuse angle with respect to the projection axis, wherein the planar waveguide is configured to receive the image-bearing light beams through an input aperture, to expand the image-bearing light beams, and to output the expanded image-bearing beams through an output aperture of the planar waveguide, wherein the output aperture is spaced apart from the input aperture along the planar waveguide; and
  c) an optical coupler that is configured to receive the image-bearing light beams along the projection axis, to reorient the projection axis with respect to the planar waveguide, to rotate the image-bearing light beams about the projection axis, and to direct the rotated image-bearing beams along the reoriented projection axis through the input aperture of the planar waveguide.

17. The display of claim 16 wherein the planar waveguide is further configured to receive the image-bearing light beams through an input aperture along a central input beam axis, and the optical coupler is further configured to reorient the projection axis into alignment with the central input beam axis.

18. The display of claim 17 wherein the planar waveguide is further configured to output the expanded image-bearing beams through the output aperture along a central output beam axis, and the central input beam axis intersects the central output beam axis on a side of the planar waveguide facing the projector.

19. The display of claim 16 wherein the optical coupler is further configured to reorient the projection axis to an acute angle with respect to the planar waveguide.

20. The display of claim 16 wherein the projector has a solid-state light source.

21. A virtual image display apparatus comprising:
  a) a projector coupled to the edge of a frame and energizable to emit an image-bearing light beams along a projection axis;
  b) a waveguide configured to receive the image-bearing light beams through an input aperture and to output the image-bearing light beams through an output aperture of the waveguide, wherein the output aperture is spaced apart from the input aperture along the waveguide; and
  c) an optical coupler that is configured to receive the image-bearing light beams along the projection axis, to reorient the projection axis to an acute angle with respect to the waveguide, to rotate the image-bearing light beams about the projection axis, and to direct the rotated image-bearing beams along the reoriented projection axis through the input aperture of the waveguide,
  wherein the optical coupler comprises:
    (i) a first prism facing the projector and having a first reflective surface that reorients the projection axis; and
    (ii) a second prism that is optically coupled to the first prism and has a second reflective surface that further reorients the projection axis;
  wherein an optical stop of the projector is disposed within the optical coupler.

22. The apparatus of claim 21 wherein the optical coupler further comprises a third prism that is optically coupled to the second prism and has a third reflective surface that yet further reorients the projection axis to the acute angle with respect to the waveguide.

* * * * *